May 15, 1962     F. WENGER     3,034,420

GRILLING OVEN

Filed Feb. 16, 1959     2 Sheets-Sheet 1

INVENTOR.
Frédéric Wenger

BY
Patent Agent

May 15, 1962  F. WENGER  3,034,420
GRILLING OVEN
Filed Feb. 16, 1959  2 Sheets-Sheet 2

INVENTOR.
Frédéric Wenger
BY
Patent Agent 3,034,420
GRILLING OVEN
Frédéric Wenger, 4 Bel Air, Lausanne, Switzerland
Filed Feb. 16, 1959, Ser. No. 793,426
Claims priority, application Switzerland Feb. 18, 1958
1 Claim. (Cl. 99—392)

It is well known that broiling of a piece of meat on a charcoal grill is considered by experts to be the best manner of preparing a grillade. The operating principle of the charcoal grill substantially consists in lighting a coal fire underneath a heavy metal grate. As soon as the coal glows properly and the metal grate has reached the temperature required for the piece of meat to be prepared, the latter is placed on the grate and then broiled by both the heat of contact and the heat of radiation.

Operation and maintenance of a charcoal grill, however, is tedious and uneconomical. Furthermore, expert grilling of the various types of meat demands comprehensive special knowledge. In addition, a charcoal grill displays the disadvantage that the piece of meat must be turned in order to be broiled on either side.

The present invention has for its object to utilize the advantages of the preparation on a charcoal grill while eliminating the drawbacks cited and rendering it largely independent of the individual broiling skill of the operator.

It is another object of this invention to provide a simple but highly effective grill carrying carriage for a grilling oven.

The present invention relates to a grilling oven having at least two sheet-type heating elements disposed substantially parallel with one another.

According to this invention the grilling oven is characterized by means designed to broil a piece located between the heating elements by radiation from two sides and by contact heat from at least one side, the relative ratio among the two types of action being adjustable.

The grilling oven is preferably provided with a closed housing having at least one charging opening, at least one heating element being displaceable from the outside in respect of its distance from the other element and a clamping device having two grates to accommodate the piece to be broiled and being disposed on an independent frame movable relative to the housing, while means are provided for independent pre-heating of the grates and automatic switching means are designed to reduce the heating action when the clamping means is outside the housing.

The abovementioned objects and advantages of the invention will appear more clearly from the following specification in connection with the accompanying drawings, in which.

Figure 1:
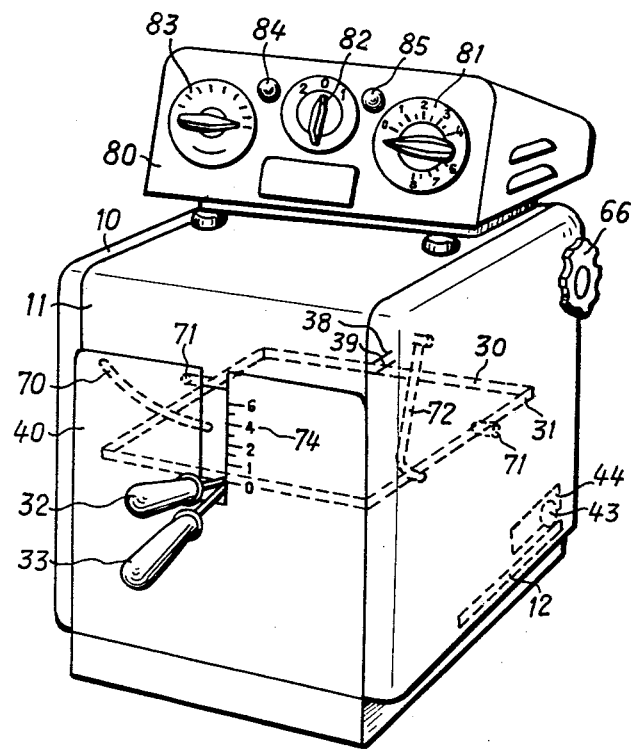
FIG. 1 is a perspective view of a complete grilling stove according to the invention.

The grilling stove as shown in FIG. 1 comprises a housing 10 having arranged therein a carriage 20 (FIG. 2) movable selectively into and out of the housing 10. Carriage 20 is guided by rails 12 arranged in the bottom of the housing, and carries a pair of substantially horizontally arranged grilling grates 30, 31.

The two grilling grates 30 and 31 are each equipped with a flat handle 32, 33 arranged on a flat tongue 34, 35 and are designed to hold the object to be broiled. The grates are provided with interstices 36 and bars 37 of a thickness of up to 6 mm. This gives them a large thermal capacity so that the grate pattern is well burned into the surface of the piece being broiled when the grates are preheated. The grates may have those sides thereof which face each other provided with pointed projections (not shown) distributed over the grate area so that the piece to be broiled is held fast.

The grates are provided with pivots 38, 39 which, together with the handles, allow the grates to be suspended in the movable carriage.

Figure 2:
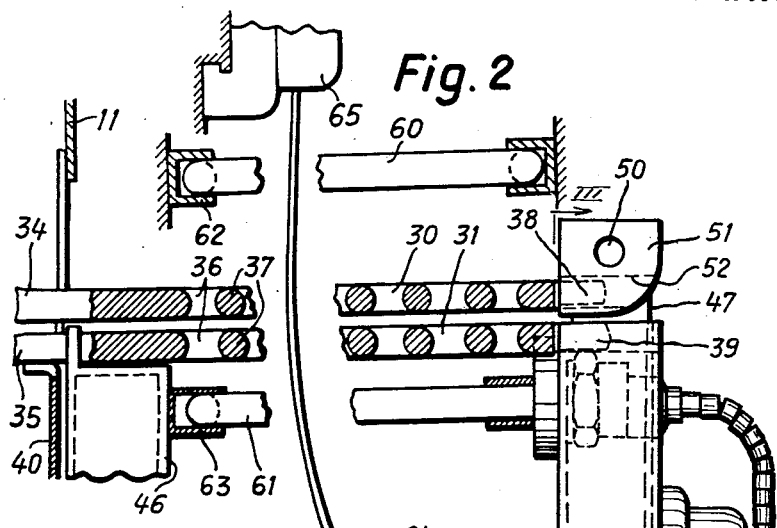
FIG. 2 illustrates on a scale larger than FIG. 1 and partly in section the movable carriage and parts arranged at the inside of the housing of the stove.
Figure 3:
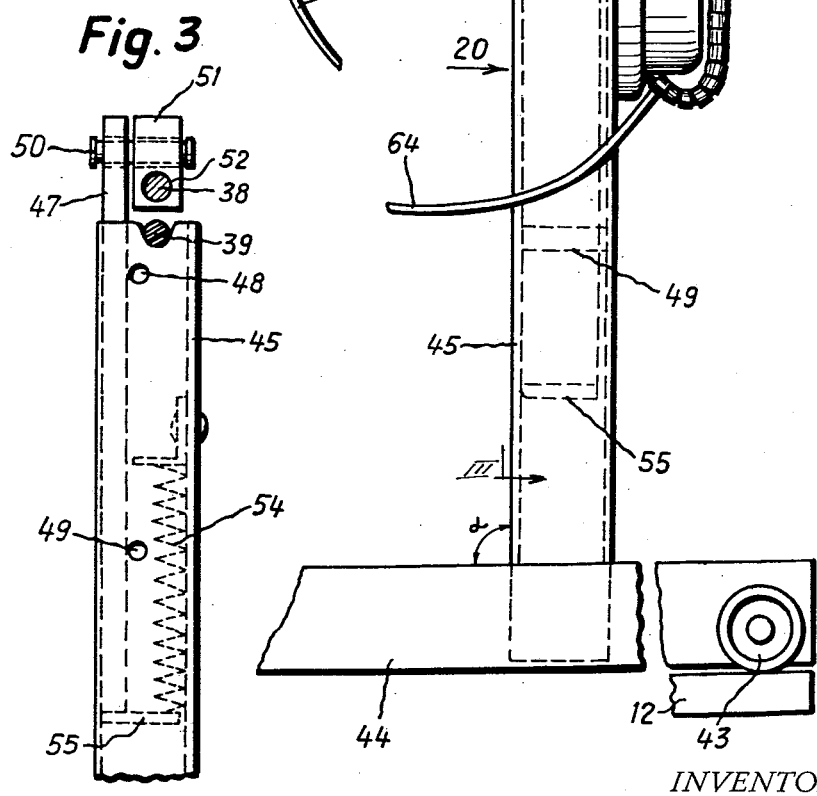
FIG. 3 illustrates the rear clamping device of the embodiment according to FIG. 2 and more specifically is a section taken along the line III—III of FIG. 2.

FIGS. 2 and 3 shows details of the movable carriage 20 and parts of the inner structure of the stove. The handle 32 of the upper grate 30 and the handle 33 of the lower grate 31 are omitted in FIG. 2, only the tongues 34 and 35 being visible. The grates are supported in the carriage 20 at their front and rear end. The rear supporting members are also shown in FIG. 3. The lower grate 31 is supported by an upper groove in the rear supporting upright 45 of the carriage in which the pivot 39 is placed, and in a similar groove in the front supporting upright 46 of the movable carriage.

Slidably accommodated in the supporting upright 45 is a column 47 guided by two pins 48 and 49. Swivelled to its upper end by means of the pivot 50 is a tongue 51 the lower end of which is equipped with a bearing eye 52 for receiving the pivot 38 of the upper grate 30. The column 47 is loaded by a compression spring 54 (FIG. 3) supported in the interior of the upright 45, the said spring acting on a stop 55 of the column in order to exercise a sustained clamping pressure between the two grates. Attached to the handle tongue 35 of the lower grate and movable together with the carriage 20 is a portion of the front wall 40, while the numeral 11 designates the stationary front wall of the housing 10. The lower grate 31 has its front end supported by the front supporting upright 46 which constitutes part of the pull-out carriage 20. The front supporting upright 46 and the rear supporting upright 45 are fixedly attached to a lower frame 44 of the carriage on which rollers 43 are provided for movement of the carriage 20 with respect to the housing 10, the rollers being guided by the rails 12. The rear supporting upright 45 encloses an angle α with the frame 44 which angle is somewhat larger than 90° since the frame as well as the rails 12 are slightly inclined, whereas the upright extends vertically.

In the grilling stove there are provided two heating elements 60, 61 extending substantially parallel to the grates 30, 31. The element 60 is arranged above the upper grate 30 and the element 61 is arranged below the lower grate 31. The lower heating element 61, which may be designed in the form of a heating coil, is arranged directly in the pull-out carriage 20 by means of a clamping piece 63. The current supply line 64 is flexible and attached to both the rear end of the carriage 20 and to the front portion of the housing at 65 (FIG. 2). The upper heating element 60 is carried at the inside of the housing by clamping means 62 similar to the clamps 63. Means may be provided for adjusting the element 60 as to height with respect to the upper grate 30 when pieces of different thickness to be grilled are clamped between the grates. The adjustment may take place from the outside of the housing 10 at the hand wheel or knob 66 (FIG. 1), the adjusting means being known per se in the art and not shown in the drawing.

FIG. 1 also shows structural details of the grilling stove. Attached to the lower grate is the front wall portion 40 forming part of the mobile carriage. Lateral guides 70 are preferably provided in the housing 10 which co-operate with laterally projecting pins 71 at the upper grate 30 in such a matter that they are raised by the guides 70 when the carriage is withdrawn so as to raise the upper grate 30 automatically. The carriage may be designed for automatic withdrawal or for manual withdrawal by means of the handle 33.

The guides 70 may be replaced by lateral hooks 72 suspended in the housing so as to be capable of a swinging movement. When the carriage and the grates are pulled out, the hooks 72 will engage the pins 71 and will automatically raise the upper grate 30. After replacing or removing the piece to be broiled, the upper grate again drops automatically when the carriage is pushed into the housing.

According to FIG. 1, a scale 74 is provided on the front wall portion 40 and indicates the broiling time to be set on the time switch in accordance with the distance between the grates, i.e. with the thickness of the pieces to be broiled and loaded between the grates.

A separate control head 80 contains the time switches and electrical controls. These controls are thermally insulated with respect to the interior of the housing 10. The electrical equipment of the grilling stove comprises at least two time switches with associated pilot lamps. The time switch 81 is designed for setting the desired broiling time in accordance with the indication at the scale 74. The reference numeral 82 designates a multipoint and main switch by means of which the full output or a reduced output may be provided or the stove stopped altogether. At the position of the switch 82 for full output, however, it is possible by means of an automatic limit or end switch (not shown) to reduce the heating when the carriage 20 is outside the housing. In addition, a switch 83 is provided by means of which a thermostat may have its limiting value adjusted. This thermostat, the design of which is known per se, is arranged in the interior of the housing 10 and controls the output of the heating elements in conformity with the temperature obtained in the housing. The circuit is such as to energize the thermostat only when the time switch 81 for the broiling time is at zero so that a reduced heating output is provided. The said thermostat is provided for preheating the grates when the carriage is placed in the interior of the housing without, however, being loaded with pieces to be broiled. To this end, a temperature of about 200° C. must be maintained so that the grates become hot enough to subsequently burn the lattice pattern into the piece to be broiled. This preheating of the grates may also be obtained after the time switch has stopped, and is effected by means of a reduced heating output with the carriage in withdrawn position whenever the grates are to be prevented from cooling.

By means of this arrangement, the grilling stove may also be employed to prepare toast, pastries, au-gratin dishes and all other dishes which require sustained heating at a comparatively low temperature. The numerals 84 and 85 further designate two pilot lamps indicating the proper operation of the electrical equipment.

The circuit may be such that the thermostat is automatically short-circuited and, therefore, rendered inoperative if the time switch 81 is set for the broiling time. For this purpose, the switch 82 is set at position 1. At the position 2 of the switch 82 the thermostat may be cut in and rendered operative also when the broiling time has been set at the time switch 81. This arrangement is provided for the preparation of cakes and fine pastries.

Different modes of operation of the grilling stove shall now be described by way of example.

If a piece of meat is to be broiled, the switch 82 is first set to position 2, and the thermostat switch 83 is set for a temperature value of e.g. 200° C. As soon as the empty grates have been pre-heated, the carriage 20 is pulled out of the housing 10 by handle 33, the upper grate 30 being raised thereby. The meat is then placed between the grates, the carriage pushed into the housing, the lattice pattern of the bars 37 beginning to be burnt into the meat. The broiling time in minutes corresponding to the thickness of the piece of meat is read off the scale 74 and set at the time switch 81. At the same time, the switch 82 is set to position 1 so that the heating output is controlled only by the time switch. Subsequently, the meat is heated at the same time by means of the heat accumulated in the preheated grates, which are in contact with the meat, as well as by means of radiation heat emitted by the heating elements and passing directly through the interstices 36 of the grates. After the expiration of the time preset at switch 81, the carriage may be automatically released, or it may be withdrawn by hand, the upper grate again being automatically raised and the heating output being automatically reduced.

The lower heating element 61 being arranged in the carriage 20 and connected to the housing as shown in FIG. 2, the grates are kept warm or preheated when the carriage is withdrawn and the heating output reduced so that broiling time is saved and the lattice design of the grates is completely burnt into the pieces of food.

In order to prepare cake or toast and the like, the switch 82 is set at position 2 while the thermostat switch 83 is set at the baking temperature required, whereupon the temperature set can be maintained for any length of time.

These few examples show the great flexibility in use of the grilling oven according to the present invention.

Having now particularly described and ascertained the nature of my said invention and in what manner the same is to be performed, I declare that what I claim is:

In a grilling stove having a housing: a carriage movable selectively into and out of said housing, an upper substantially horizontally arranged heatable grilling grate, a lower substantially horizontally arranged heatable grilling grate located below said upper grilling grate, means for selectively moving said grilling grates toward each other or away from each other for respectively clamping the food to be heat treated therebetween or releasing the same therefrom, means connecting said grates to said carriage so as to be movable therewith, two heating elements substantially parallel to said grates, one of said heating elements being arranged above said upper grate and the other one of said heating elements being arranged below said lower grate so as to be able to heat said grates and to radiate heat through the interstices of said grates for heating food between said grates by radiation heat and contact heat, that heating element which is below said lower grate being connected to said carriage for movement therewith, and flexible current feeding means arranged in the housing and connecting the rear portion of said last mentioned heating element to the front portion of the housing.

References Cited in the file of this patent

UNITED STATES PATENTS

| | | |
|---|---|---|
| 1,717,592 | Wheelock | June 18, 1929 |
| 1,746,698 | Galer | Feb. 11, 1930 |
| 1,786,345 | Itzi | Dec. 23, 1930 |
| 1,870,170 | Browning | Aug. 2, 1932 |
| 2,059,911 | Rebora | Nov. 3, 1936 |
| 2,092,226 | Simons | Sept. 7, 1937 |
| 2,102,097 | Sherman | Dec. 14, 1937 |
| 2,171,510 | Stirgwolt | Aug. 29, 1939 |
| 2,407,648 | Boehm | Sept. 17, 1946 |
| 2,738,723 | Jennett | Mar. 20, 1956 |
| 2,744,995 | Jepson | May 8, 1956 |
| 2,788,834 | Weeks | Apr. 16, 1957 |
| 2,851,575 | Walston et al. | Sept. 9, 1958 |
| 2,887,039 | Bacon | May 19, 1959 |